(12) United States Patent
Anderson

(10) Patent No.: US 8,790,069 B2
(45) Date of Patent: Jul. 29, 2014

(54) ENCLOSED VERTICAL AXIS FLUID ROTOR

(75) Inventor: Bruce Elliot Anderson, Eugene, OR (US)

(73) Assignee: No Fossil Energy, LLC, Odenton, MD (US)

( * ) Notice: Subject to any disclaimer, the term of this patent is extended or adjusted under 35 U.S.C. 154(b) by 845 days.

(21) Appl. No.: 12/905,058

(22) Filed: Oct. 14, 2010

(65) Prior Publication Data
US 2011/0142641 A1 Jun. 16, 2011

Related U.S. Application Data

(60) Provisional application No. 61/272,626, filed on Oct. 14, 2009, provisional application No. 61/283,988, filed on Dec. 10, 2009.

(51) Int. Cl.
*F03D 11/00* (2006.01)

(52) U.S. Cl.
USPC ............. 415/4.2; 415/4.4; 415/905; 415/907; 416/169 R; 416/197 A; 416/229 R; 416/240

(58) Field of Classification Search
USPC ........ 415/4.2, 4.4, 905, 907; 416/169 R, 172, 416/197 A, 196 A, 198 R, 201 A, 229 R, 240, 416/241 A, 243
See application file for complete search history.

(56) References Cited

U.S. PATENT DOCUMENTS

| | | | | | |
|---|---|---|---|---|---|
| 588,572 | A | * | 8/1897 | Hardaway | 415/4.2 |
| 2,431,111 | A | * | 11/1947 | Du Brie | 416/130 |
| 3,942,909 | A | * | 3/1976 | Yengst | 416/132 B |
| 4,245,958 | A | * | 1/1981 | Ewers | 416/197 A |
| 4,357,130 | A | * | 11/1982 | Forrest | 416/197 A |
| 6,952,058 | B2 | * | 10/2005 | McCoin | 416/119 |
| 7,362,004 | B2 | * | 4/2008 | Becker | 290/55 |

* cited by examiner

*Primary Examiner* — Igor Kershteyn
(74) *Attorney, Agent, or Firm* — Kenneth P. Waszkiewicz

(57) ABSTRACT

A enclosed vertical axis fluid rotor used as a wind turbine of two designs having multiple sails that are concave on the inside and convex on the outer side which allows omni-directional wind or other fluids to engage sails to create optimum fluid momentum. These are sectional segmentation of each rotor that can be stacked upon one another at locating lug points to be attached to each rotor to keep radial alignment precise during assembly. The preferred embodiment would be of composite materials or plastics that can be molded to a given design of three or more stages. The advantage of this turbine is using the fluids to their optimum efficiency. These designs have low starting speed, low precession, and low drag. One design has a central axis that turns with bearings with the rotor and the other design is a central static (non-turning) axis shaft that allows the turbine to turn on bearings.

19 Claims, 5 Drawing Sheets

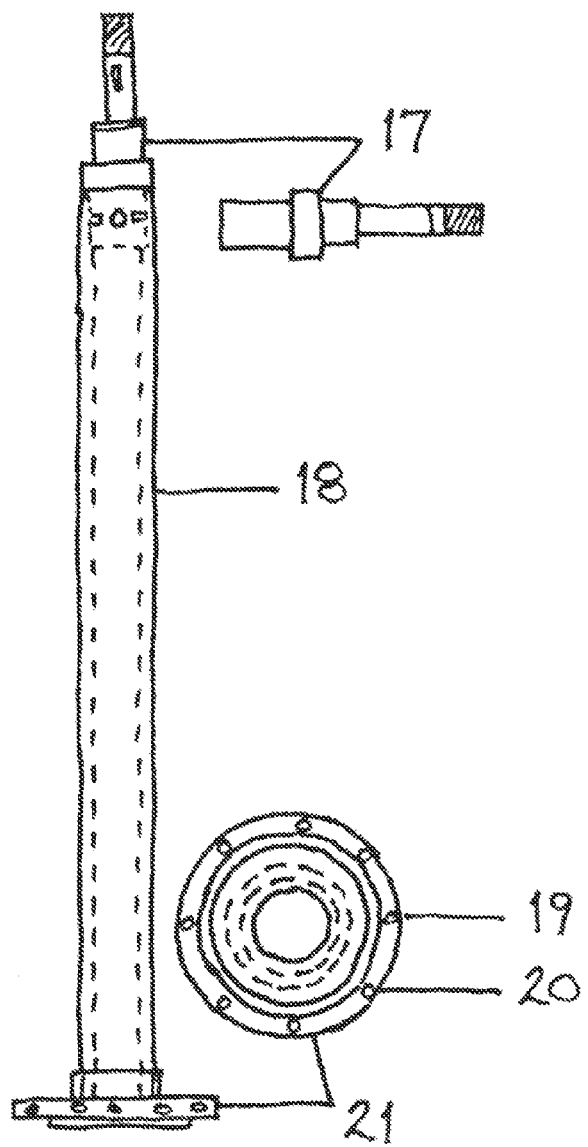

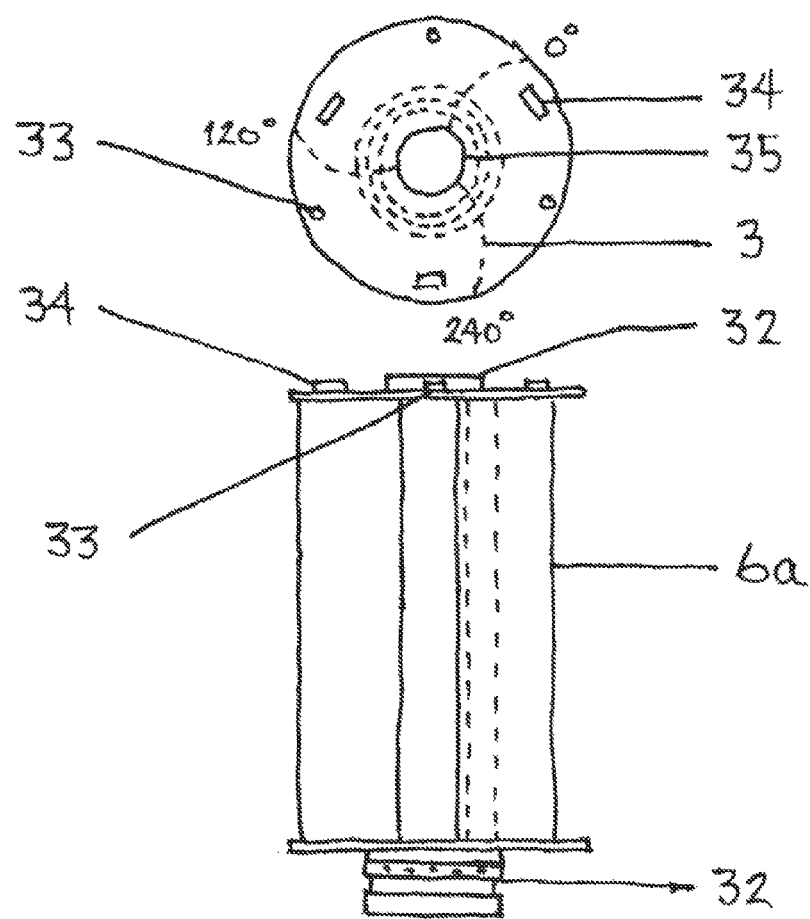

ENCLOSED VERTICAL AXIS FLUID ROTOR

BACKGROUND

Prior art for wind turbines most commonly seen in photographs and video, and having a horizontal axis, suffers from several problems. Foremost is that it is not very efficient in terms of C-sub-p or maximum power coefficient unless made in large scale, suitable only for some geographical areas. These devices also require auxiliary equipment to align the rotating axis constantly with the current wind direction, and separately to start the rotation when wind resumes after a period of nil or small wind.

Vertical axis wind turbines have been taught and have the advantage of not requiring external alignment and start-up equipment, but they have been relatively inefficient. There has been a need for an efficient vertical axis wind turbine that can be erected with small dimensions, suitable for suburban or possibly even urban installation while producing enough electric power to be economically worthwhile to install.

The vertical wind turbine of VanDerHye et al, U.S. Pat. No. 7,314,346, differs from the one disclosed here in two respects, although both are based on the well-known Savonius design first disclosed in U.S. Pat. No. 1,697,574. First, the VanDerHye device requires careful manufacture of the blades to a precise mathematical formula, which is an economic drawback. Second, the VanDerHye device has blades that are not enclosed top and bottom and thus allow air (or other driving fluid) to spill out of the blades and reduce efficiency. The device disclosed here uses an enclosed design (top and bottom of each blade set or rotor) to prevent that.

Like the Benesh design, first disclosed in U.S. Pat. No. 5,494,407, the blades in the current invention are fixed to upper and lower plates. However, until 407, here there are no linear (in cross section) or flat portions of the blades, or any overlap where a blade is parallel to another blade. Moreover, here the turbine consists of not one but three or more blade-sets, angularly offset from one another.

The enclosed vertical axis fluid rotor acting as a wind turbine disclosed here is self-starting, needs minimal alignment, and operates efficiently at a wind range of wind or water current speeds (producing more electric power at higher speeds). It produces substantial power in relatively small size scales, but can be scaled up readily. It is suitable for operation in both air current (wind) and water current.

SUMMARY

This invention consists of a set of three blade-sets or rotors, each of equal height, rotating about a common vertical axis, with each blade-set enclosed by circular horizontal plates. Each blade-set consists of three same-sized rectangular blades or sails emanating from the center axis and rigidly attached at equal approximately 120 degree angles to the circular enclosing plates at their tops and bottoms. Each blade is formed as the natural result of bending the blade material to fit its actual length into a distance between approximately 40% and 60% of the distance from the rotation axis to the edge of the attached top and bottom plate.

Each blade-set is rotated from the next so that the second is rotated approximately 20-60 degrees from the first, such that the concavity of the second blade set is behind that of the first, and the third is still another approximately 20-60 degrees behind the second or approximately 40-120 degrees behind the first. Beyond the third blade-set it is possible (although not shown in the figures) to have a plurality of additional stages.

A person having ordinary skill in the relevant art will see that the device disclosed here can be built in either clockwise or anti-clockwise parities (as seen from the top), which are fully equivalent.

Such a person will also see that the turbine disclosed here differs from the non-enclosed VanDerHye design.

Such a person will additionally see that the design can be used efficiently in reverse, as a pump or a fan.

Such a person will see that the blade-set (rotor) design is such that when air or other fluid spills out of a given blade, once it no longer directly faces incoming air or fluid, that air other other fluid operates by Bernoulli effect on the rear of the neighbor blade, adding to the power imparted to the rotor system.

And such a person will see that the design in its preferred embodiment uses a hollow non-rotating shaft. This shaft is static, with the overall blade assembly rotating about it on bearings. This reduces blade vibration and transmission, so blade material fatigue is much reduced, and very little noise emanates from the shaft, keeping overall noise to a minimum. This arrangement also reduces weight compared with a solid shaft.

BRIEF DESCRIPTION OF THE DRAWINGS

FIG. 6 is a plane view that illustrates one embodiment of the shaft with details of the bottom plate.

FIG. 7 is a top and side view that illustrates one embodiment of the rotor assembly.

DETAILED DESCRIPTION OF THE PREFERRED EMBODIMENTS

Figure 1:
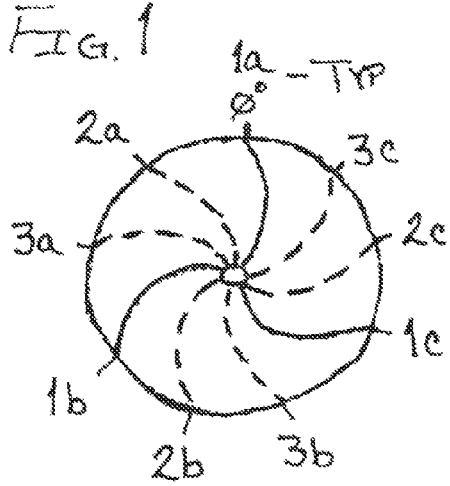
FIG. 1 is a schematic view that illustrates one embodiment of the blades and the three-stage design of a fluid rotor.

FIG. 1 is a schematic view of the blades (constructed for clockwise rotation), showing the three-stage design. There are three blades to each stage or rotor in the preferred embodiment. These blades are spaced at approximately 120 degrees apart. Top view first stage, blade-set 1-1a, 1b, and 1c are approximately 120 degrees apart @ 0 degrees rotation. Second stage blades, blade-set 2-2a, 2b, and 2c are approximately 120 degrees apart @ 20-60 degrees counter clockwise rotation from the first stage (40 degrees in preferred embodiment). Third stage blades, blade-set 3-3a, 3b, and 3c are approximately 120 degrees apart @ 40-120 degrees counter clockwise rotation from the first stage (80 degrees in preferred embodiment).

Figure 2:
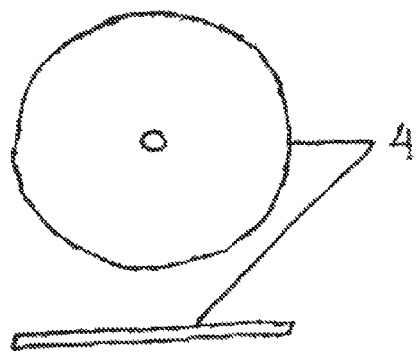
FIG. 2 is a top and side view that illustrates one embodiment of the circular plates assembled on the top and bottom of each stage of the fluid rotor.

FIG. 2 shows the circular plates 4 in top and side views that hollow shaft 5 goes through. Typically, four such plates make up all the stages of the rotor, attaching in total three sets of blades. Plate 4 shows the hole which receives the shaft 5 to which the plates are attached.

Figure 3:
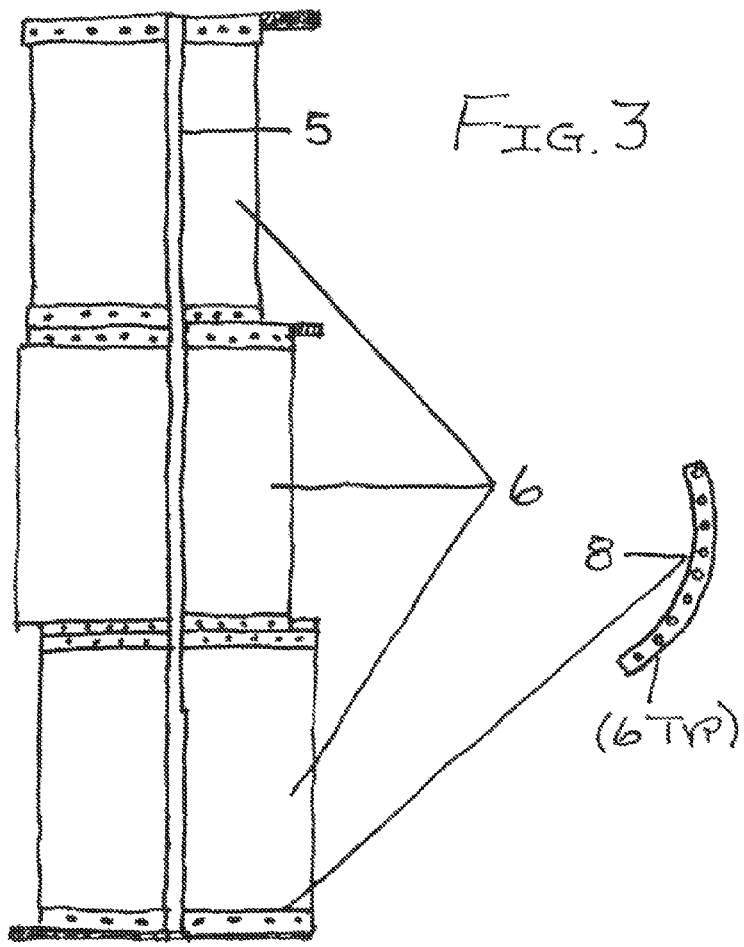
FIG. 3 is a plane view that illustrates one embodiment of the assembled rotation portion of the fluid rotor.

FIG. 3 shows a plane view of the assembled rotation portion of the turbine. Shaft 5 attaches to 6 the three stages of the preferred embodiment to each other. Components 8 are formers, shown in top view, pre-bent shapes in aluminum or other material attached to the top and bottom of blades (preferably welded) and to the plate 4 by welding. There are six formers per stage, two per blade set, eighteen formers for the three stages. The blades are also attached (welded in the preferred embodiment) to the hollow shaft 5.

Figure 4:
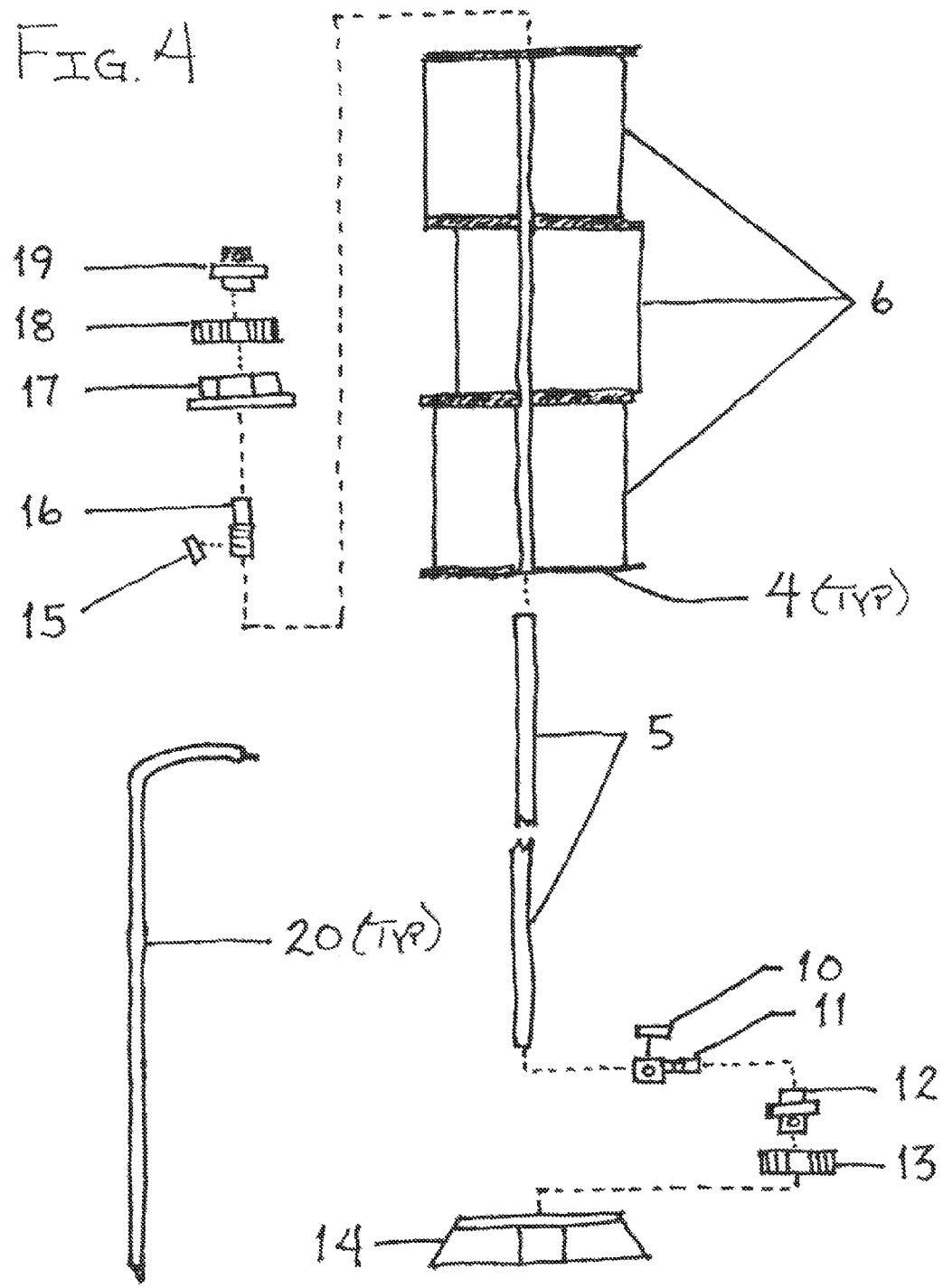
FIG. 4 is an expanded view that illustrates one embodiment of the assembly of the fluid rotor.

FIG. 4 is an assembly of the entire turbine. It includes these components: hollow shaft 5 runs through plates 4 and through 6 (which is the turbine embodiment), 11 (which is the bottom bearing keyed shaft driver) is then inserted into 5, spring pin 10 goes through 5 and 11, 11 is then inserted into ER bearing 12 which is locked onto 11 by set screw, 12 is lightly pressed into 13 (which is the bottom bearing adjustment plate) and is then bolted to 14 (which is the base). At the top of the embodiment 6, which shaft 5 goes through, 16 (which is the upper bearing shaft) is then inserted into 5 at the top and spring pin 15 is inserted through 5 and 16, 16 then goes through 17 (which is the upper bearing adjustment mount), 16 then goes through 18 (which is the upper adjustment bearing plate), 18 is then bolted to 17, 19 is an ER bearing which is lightly pressed into 18 (which is the upper adjustable bearing housing), is then locked with set screw onto 16, and 20 are four tubular braces that are equally spaced and welded to 14 and to 17 (which are the braces for the total embodiment).

This is the description of the drawings of the second embodiment of the same invention. FIG. 1 and FIG. 2 are the same as in paragraphs [0013] and [0014].

The blades run on a rotation axis that allows the blades to be engaged by fluid at any angle and will produce rotation at any approximate perpendicular direction of fluid. (The blades can be constructed for anti-clockwise rotation with no change in function, the choice for the drawing is arbitrary.)

Figure 5:
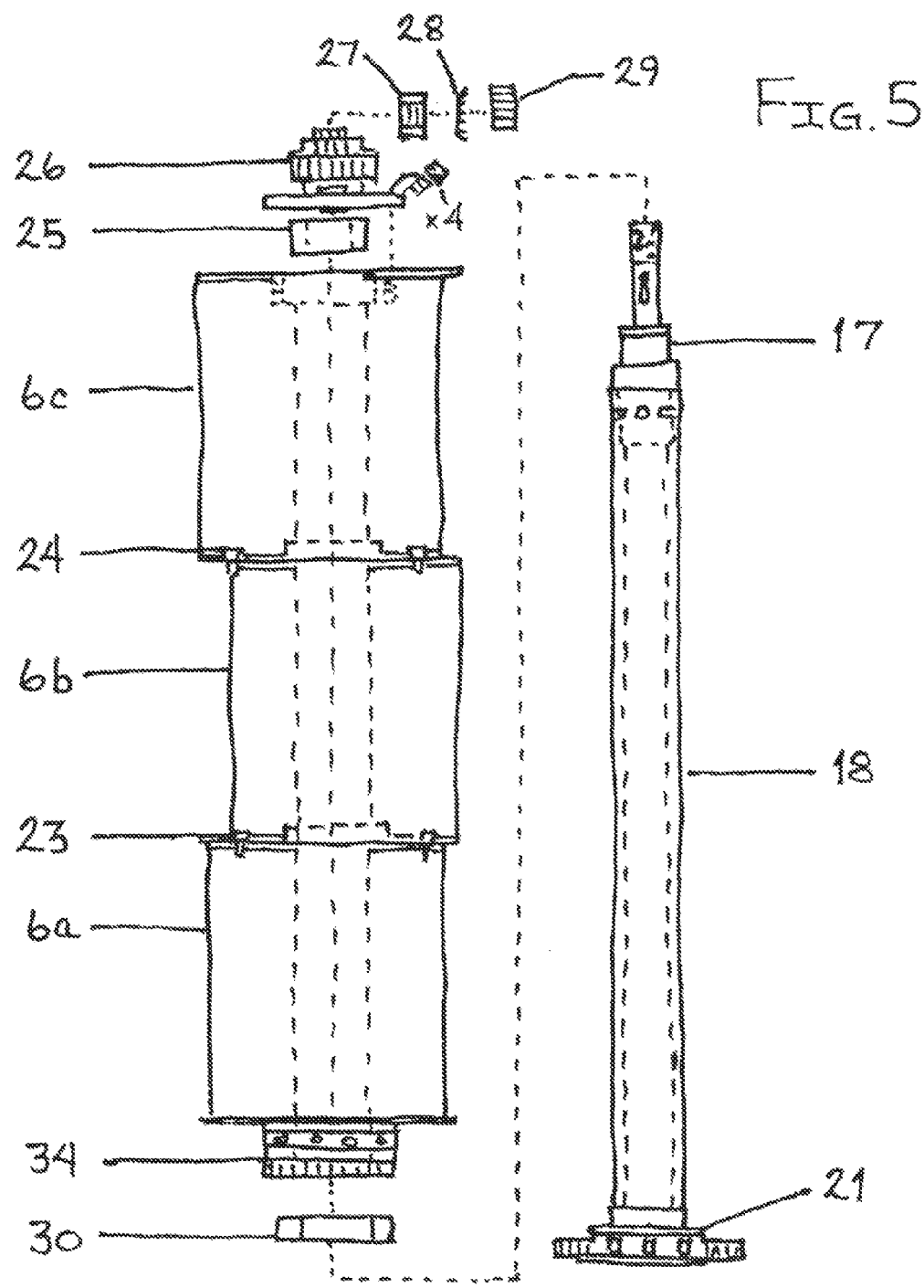
FIG. 5 is an expanded view that illustrates one embodiment of the assembly of the static shaft, complete rotor assembly, and bearings and brake assemblies.

FIG. 5 is an assembly drawing of the static shaft, complete rotor assembly and bearings and brake assemblies. Specifically, 18, hollow shaft (composite materials in preferred embodiment), is attached at the bottom to 21, hub, preferably by welding or bolting. Stub shaft 17 is attached to 18 by bolts and holds bearing 25. In turn, 25 is keyed to hydraulic brake 26, which limits the rotation speed of rotor assembly 6 at high wind/fluid speeds. The top assembly of the shaft is completed by 27, spring or pre-load bushing, 28, lock washer, and 29, bearing nut that adjusts 25. The rotor assembly 6 consists of lower rotor 6a, middle rotor 6b, and top rotor 6c. In the preferred embodiment, each rotor is molded or extruded from plastic or composite material for low weight and durability. Each such rotor combines the blades plus upper and lower circular plates as shown in FIG. 7. The rotors are attached to one another in an angularly offset fashion (see FIG. 1) using lugs 34 and bolts 33.

FIG. 6 shows just the assembly with details of bottom plate 21 including holes 19 and thread holes 20. The threaded holes allow adjusting bolts to adjust the entire unit to be exactly vertical when attached to a bottom plate (not shown) by 21.

FIG. 7 shows how the three rotors 6a, 6b, and 6c are attached pairwise, using lugs 34 and bolts 33 passed through the circular top and bottom plates molded into each rotor. The precise angular location of the lugs establishes the angular offsets between the three rotors.

What is claimed is:

1. An enclosed vertical axis fluid rotor comprising:
    a rotor system having at least three stages, each stage having at least three sails that are enclosed and spaced about a central axis that is mounted upon a shaft with bearings, wherein each sail is a convex airfoil that extends from the central axis out to its terminate, has a rectangular shape with a concave back, and has a shape that allows fluid to push on the concave side of each sail, and pull on the convex side of each sail, wherein said at least three stages are stacked vertically along the central axis, and wherein each stage includes a circular top plate and a circular bottom plate; and
    a hydraulic brake system that is mounted upon the shaft with bearings.

2. The enclosed vertical axis fluid rotor as set forth in claim 1, wherein the rotor system is a wind turbine.

3. The enclosed vertical axis fluid rotor as set forth in claim 1, wherein said at least three sails in each stage are located at approximately 0 degrees, 120 degrees, and 240 degrees about the central axis, and wherein a location of said at least three sails in each stage is offset approximately 40 degrees about the central axis from each other stage.

4. The enclosed vertical axis fluid rotor as set forth in claim 1, wherein the rotor system rotates about the central axis in at least one of a clockwise manner, and counter clockwise manner.

5. The enclosed vertical axis fluid rotor as set forth in claim 1, wherein the rotor system is made of at least one of light weight carbon composites, aluminum, and molded plastics.

6. The enclosed vertical axis fluid rotor as set forth in claim 1, further comprising:
    a generator that utilizes rotational energy from the rotor system to generate electricity in an enclosed cycle system.

7. The enclosed vertical axis fluid rotor as set forth in claim 1, wherein the shaft is a static non-turning shaft, and the rotor system is mounted upon, and rotates around the static non-turning shaft.

8. The enclosed vertical fluid rotor as set forth in claim 1, wherein the shaft is a rotating shaft, and the rotor system is attached to the rotating shaft, and rotating shaft rotates about the central axis to rotate the rotor system.

9. The enclosed vertical axis fluid rotor as set forth in claim 1, wherein the bearings are at least one of ball bearings, air bearings, and magnetic levitation bearings that effectuate radial movement about the central axis.

10. The enclosed vertical axis fluid rotor as set forth in claim 1, wherein the rotor system is omnidirectional.

11. A fluid rotor, comprising:
    a shaft having an axis that runs from a first end of the shaft to a second end of the shaft;
    a stub shaft attached to the first end of the shaft;
    a rotor assembly comprising:
        a hydraulic brake that connects the rotor assembly to the stub shaft;
        a blade assembly that is mounted upon the shaft, and that rotates around the axis of the shaft, the blade assembly comprising:
            a first blade stage that includes a hub, at least three blades in a configuration that locates each blade at equal distances around the hub, and an upper plate and a lower plate that enclose the hub and said at least three blades;
            a second blade stage that includes a hub, at least three blades in a configuration that locates each blade at equal distances around the hub, and an upper plate and a lower plate that enclose the hub and said at least three blades; and
            a third blade stage that includes a hub, at least three blades in a configuration that locates each blade at equal distances around the hub, and an upper plate and a lower plate that enclose the hub and said at least three blades,
        wherein the first blade stage, the second blade stage, and the third blade stage are stacked to align a central axis of the hub of each blade stage with the axis of the shaft, and to allow rotation of the blade assembly about the axis of the shaft, wherein each blade in each blade stage is a convex airfoil that extends from the hub in a radial direction, that has a rectangular shape, and that has a concave back, and wherein a shape of each blade allows fluid to push on the concave side of each blade, and pull on the convex side of each blade; and a bearing that bears friction between the hydraulic brake and the blade assembly; and a base attached to the second end of the shaft for mounting the shaft to a surface.

12. The fluid rotor of claim 11, wherein the lower plate of the first blade stage is attached to the upper plate of the second blade stage, and the lower plate of the second blade stage is attached to the upper plate of the third blade stage.

13. The fluid rotor of claim 11, wherein each upper plate in each blade stage is a circular upper plate having a hub opening, and wherein each lower plate in each blade stage is a circular lower plate having a hub opening.

14. The fluid rotor of claim 11, wherein said at least three blades in each blade stage are located at approximately 0 degrees, 120 degrees, and 240 degrees about the central axis of the hub.

15. The fluid rotor of claim 11, wherein the location of said at least three blades in each blade stage are offset at equal distances about the central axis of the hub from each other stage.

16. The fluid rotor of claim 11, wherein said at least three blades in the first blade stage are located at approximately 0 degrees, 120 degrees, and 240 degrees about the central axis of the hub, said at least three blades in the second blade stage are located at approximately 40 degrees, 160 degrees, and 280 degrees about the central axis of the hub, and said at least three blades in the third blade stage are located at approximately 80 degrees, 200 degrees, and 320 degrees about the central axis of the hub.

17. The fluid rotor of claim 11, further comprising:

a generator that utilizes rotational energy from the rotor assembly to generate power in an enclosed cycle system.

18. The fluid rotor of claim 11, wherein the hydraulic brake limits the rotational speed of the rotor assembly to a maximum speed.

19. The fluid rotor of claim 11, wherein the bearing is at least one of a ball bearing, air bearing, and magnetic levitation bearing that effectuate radial movement about the axis of the shaft.

* * * * *